United States Patent [19]

Miller

[11] Patent Number: 5,642,869
[45] Date of Patent: Jul. 1, 1997

[54] APPARATUS FOR DETECTING THE DISTANCE BETWEEN TWO OBJECTS

[75] Inventor: John Miller, Auburn, N.Y.

[73] Assignee: TeleEngineering, Inc., New Foundland, N.J.

[21] Appl. No.: 565,882

[22] Filed: Dec. 1, 1995

[51] Int. Cl.⁶ .................................................. B61L 23/34
[52] U.S. Cl. .................. 246/182 B; 246/167 D; 356/4.01; 340/903; 340/942
[58] Field of Search .................. 104/299, 300; 246/2 R, 25, 182 R, 182 B, 187 R, 167 D; 356/4.01; 340/942, 903

[56] References Cited

U.S. PATENT DOCUMENTS

| | | | |
|---|---|---|---|
| 3,365,572 | 1/1968 | Strauss | 246/167 D |
| 3,823,673 | 7/1974 | Wesener . | |
| 3,949,362 | 4/1976 | Doyle et al. . | |
| 4,641,136 | 2/1987 | Kowalczyk . | |
| 4,955,291 | 9/1990 | Dillon et al. | 246/167 D |
| 4,965,583 | 10/1990 | Broxmeyer | 246/167 D |
| 5,039,217 | 8/1991 | Mackawa et al. . | |
| 5,162,643 | 11/1992 | Currie . | |
| 5,166,681 | 11/1992 | Bottesch et al. . | |
| 5,249,157 | 9/1993 | Taylor . | |
| 5,302,835 | 4/1994 | Bendett et al. . | |
| 5,367,458 | 11/1994 | Robert et al. . | |
| 5,432,509 | 7/1995 | Kajiwara . | |

FOREIGN PATENT DOCUMENTS 63-124602  5/1988  Japan .

*Primary Examiner*—S. Joseph Morano
*Attorney, Agent, or Firm*—William Squire

[57] ABSTRACT

An optical scanner transmits a light beam from the forward end of a moving track vehicle with the beam inclined toward the direction of movement toward another vehicle on the track. A highly reflective retroreflector tape is secured to the rear end of the other vehicle having an effective reflector region offset from the location of the transmission of the beam at the scanner. The angle of inclination and the amount of offset geometry are proportional to the distance between the vehicles. The scanner senses the return beam which is coaxial with the transmitted beam using a Schmitt trigger circuit to sense the threshold level of the returned beam. The resulting output signal is used to stop the moving vehicle at a predetermined spacing from the other vehicle.

23 Claims, 2 Drawing Sheets

APPARATUS FOR DETECTING THE DISTANCE BETWEEN TWO OBJECTS

This invention relates to optical distance sensing apparatus, and more particularly, to apparatus for sensing the distance between two relatively moving vehicles to avoid collision therebetween.

U.S. Pat. No. 3,823,673 describes a system comprising numerous self propelled vehicles moving along a single track. In the event a vehicle is stopped, it transmits a voltage to a following vehicle via an electrical contact established by electrically conductive strips attached to the two vehicles. Electrical circuitry in the following vehicle is activated and the drive motor for the following vehicle is shut off and remains off while the two vehicles are in contact. When the forward vehicle resumes travel along the track, circuitry in the following vehicle delays its start up and a desired spacing between the vehicles is established between the vehicles moving on the track. The physical contact between the vehicles and the establishment of a completed circuit between the two vehicles is not believed desirable in certain implementations.

Not contacting optical detecting systems for controlling vehicles are also known. For example, in U.S. Pat. No. 5,302,835, incorporated by reference herein, an optical detection system includes a transmitting device for transmitting a light beam to create a field of view, a detecting arrangement for detecting a beam of reflected light reflected from at least one object in the field of view such as a retroreflector on the side of the path and a deflecting device such as a polarizing beam splitter for deflecting either the transmitted beam or the reflected beam.

A range channel is included for determining a distance to the object and an angle channel is included having a second detector for sensing reflected light from the at least one object to determine the angle of the reflected beam. The beam splitter splits the reflected light beam into two components directed to corresponding detectors. The transmitted beam is coaxial with the received reflected beam. The system is used for optically guiding a moving vehicle along a path. This system is relative costly in that it requires a separate distance measuring circuit which is described in U.S. Pat. No. 5,162,643 and shown in FIG. 6 of the '835 patent.

In U.S. Pat. No. 5,039,217, an optical transceiver apparatus is shown for detecting the distance between two objects such as two cars. The apparatus employs a pair of optical systems located on one car and each having a light projector and a light receiver which receives light pulses reflected from a car ahead of the one car with the apparatus. A central processing unit is included which measures the angle of projection of a pulse of light from the light projector when the light receiver of each of the driving optical systems detects the reflected pulse light to detect the distance between the two cars and the axes of the two cars. This system is relatively costly and complex in that it employs two redundant optical systems and requires a computer.

U.S. Pat. No. 4,641,136 discloses an apparatus which emits beams whose length is automatically regulated to correspond to weather or vehicle speed to provide a safe braking distance to one of the vehicles carrying the apparatus. It is assumed in the patent that the length of the beams manifests the desired safe distance between the moving vehicle and the target vehicle. Any reflected beam sensed by the apparatus is assumed valid.

The problem with this system is that transmitted beams may vary in characteristics from component to component. Also components tend to degrade with time affecting their operating characteristics. Therefore, beam lengths may also degrade or vary from device to device providing unknown variables in distance measuring. Such unknown variables are unacceptable in certain implementations.

A collision avoidance system disclosed in U.S. Pat. No. 5,249,157 includes an automatic rangefinder scanner and a processing unit which add to the cost and complexity of the system. Still other optical distance measuring or detecting systems are known. However these suffer similar draw backs as in the above noted patents in that they require computers and/or rangefinders to determine distances which add considerable cost to the systems.

The present inventor recognizes a need for a distance detecting system which is simple, low cost and uses few components. In particular, the present inventor recognizes a need for a collision avoidance system for track guided vehicles.

Apparatus according to the present invention for sensing a predetermined distance between two objects exhibiting relative movement along a path of a given direction comprises beam generating means arranged to be secured to one of the objects for generating and transmitting an electromagnetic radiation beam inclined relative to the direction of the path and directed generally toward the other of the objects. An electromagnetic radiation beam reflector is arranged to be secured to the other of the objects in a position for receiving the transmitted beam incident thereon when the objects are spaced apart a distance approximately no greater than the predetermined distance and for reflecting the incident beam. Beam detecting means are positioned to receive the reflected beam, the detecting means including means responsive to the reflected beam incident thereon for generating an output signal manifesting the objects at the predetermined distance.

In accordance with an embodiment, the detecting means includes beam detecting means for detecting the reflected beam and for generating a first signal in response to the detection of the beam and threshold detecting means responsive to the first signal applied thereto for generating the output signal in response to the first signal having a given threshold value.

In accordance with a further embodiment, the path defines an axis, the apparatus including means for spacing the reflector from the axis a distance different than the spacing of the transmitted beam at said beam generating means from the axis, the difference in spacing being proportional to the predetermined distance.

IN THE DRAWING

Figure 2:
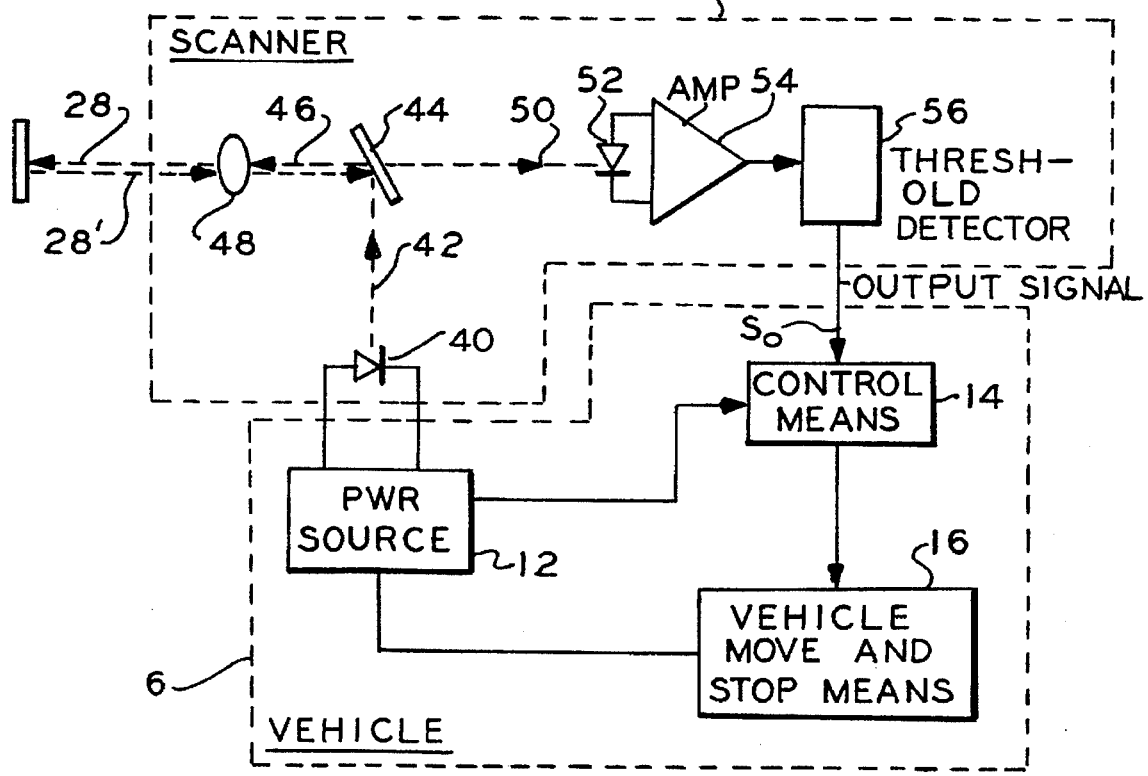
FIG. 2 is a schematic diagram of a circuit according to one embodiment of the present invention for use in the system of FIG. 1.
Figure 3:
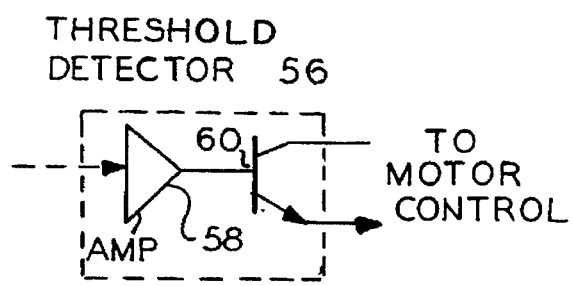

FIG. 3; is a schematic circuit diagram of the threshold detector of FIG. 2; and

Figure 4:
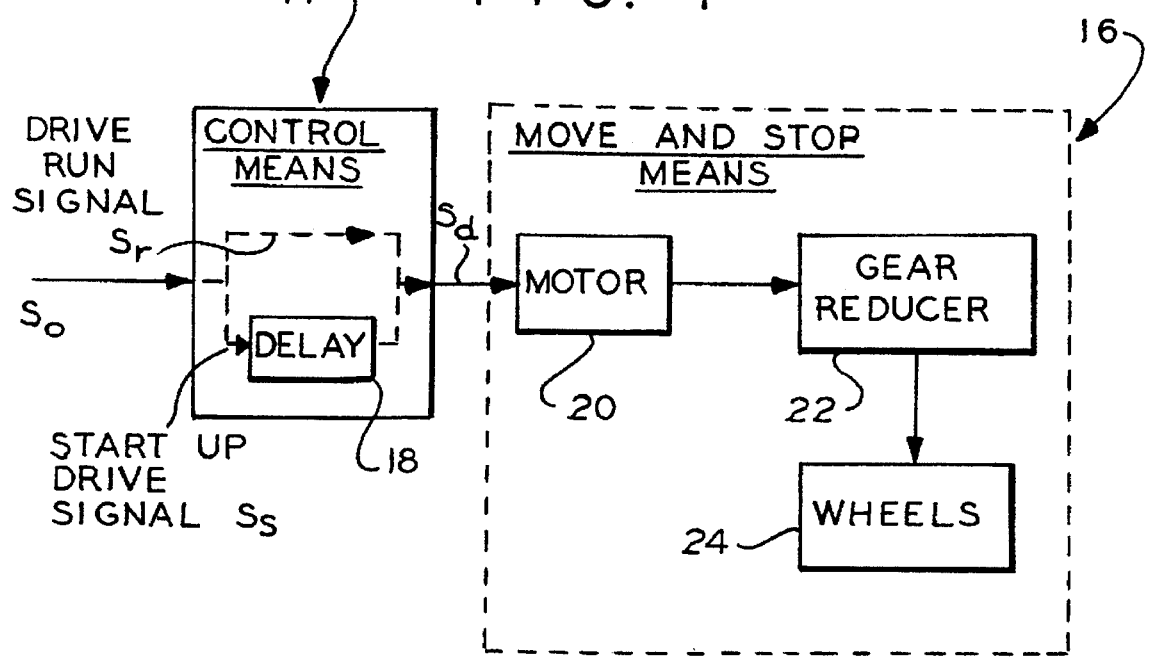

FIG. 4 is a schematic diagram of a portion of the circuit diagram of FIG. 2 according to a further embodiment.

Figure 1:
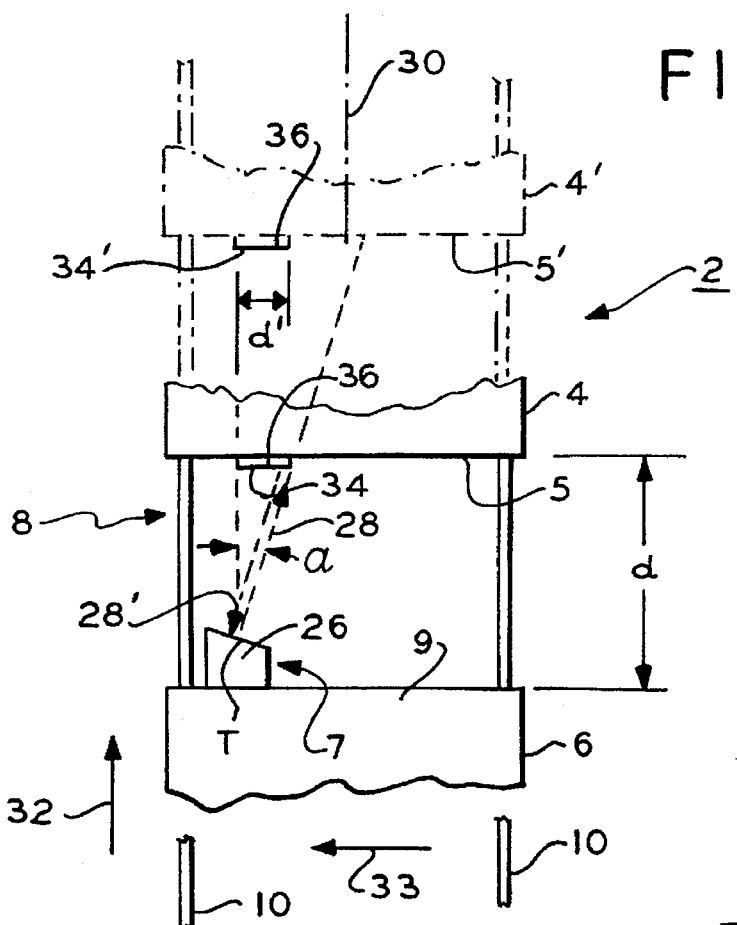
FIG. 1 is a plan diagrammatic view of a track vehicle system embodiment of the present invention.

In FIG. 1, an electrically operated track vehicle system 2 includes electrically operated vehicles 4 and 6, only a portion of which are illustrated, which move along a track network 8, only a portion of which is shown. The system 2 includes scanner apparatus 7 for stopping the vehicle 6 a distance d from vehicle 4 as it approaches vehicle 4. This distance is predetermined and comprises the distance between the rear surface 5 of the front vehicle 4 and the front surface 9 of the rear vehicle 6. These surfaces may for example comprise bumpers (not shown) on the vehicles. The apparatus 7 insures that the rear vehicle 6, as it approaches the front vehicle 4, is stopped no closer than distance d which may be, in this embodiment, preferably about six to ten inches (15.3 cm to 25.4 cm) or less.

In the Figure, the scanner apparatus 7 is shown protruding in front of the vehicle 6. In practice, the apparatus 7 may be placed beneath the front bumper (not shown) of the vehicle 6 such that the apparatus 7 does not protrude beyond the vehicle frontmost surface.

The network 8 comprises a pair of rails 10 by way of example. The track network may also comprise a monorail system or other conventional material transport systems such as conveyors, automatic guide vehicle systems and so on.

The vehicles 4 and 6 generally are identical, but may differ according to a given implementation. The vehicles 4 and 6 and track network 8 are typically commercially available.

A representative vehicle 4, FIG. 2, includes an electrical power source 12 for operating the vehicle 4. Control means 14 are conventional vehicle movement controls for operating the vehicle 4, which for example, may be used for material handling purposes in buildings and so forth. The control means is normally responsive to signals (not shown) for stopping and moving the vehicle. The control means 14 supplies power to the vehicle move and stop means 16.

In FIG. 4, the conventional control means includes a delay circuit 18 which prevents the vehicle 4 from immediately moving when power is applied thereto for operating the vehicle. The purpose of this delay is to prevent the vehicle from colliding with a forward positioned stopped vehicle, as described in more detail in the aforementioned U.S. Pat. No. 3,823,673, incorporated by reference herein, to permit the forward vehicle to move away a desired spacing prior to the rearward vehicle moving.

The output of the control means 14 in response to a vehicle drive signal $S_o$ generates, after a suitable delay, a motor drive signal $S_d$. Signal $S_d$ turns on motor 20 which drives gear reducer 22 and, in turn, wheels 24. The gear reducer 22 is such that when power is removed therefrom the gear ratio provides resistance to rotation of the wheels 24. This resistance stops the vehicle 4 serving as a brake system. This action is conventional.

The vehicles 4 and 6 are thus stopped within a few inches after power to the motor 20 is removed. The drive system thus described is diagrammatic and is given for purposes of illustration in connection with the operation of the apparatus of the present invention. Other drive and braking systems may be employed according to a desired implementation.

In FIG. 1, a beam scanner 26 is secured to the front of each vehicle in the system 2 such as vehicles 4 and 6 (only scanner 26 on vehicle 6 being shown). The scanner 26 transmits a focussed light beam 28. The scanner 26 is oriented such that the beam 28 is inclined at angle α to axis 30 which is parallel to direction 32 of the rails 10 at this location of the track network 8. The rails 10 at this location are straight, but may also curve. The distance measuring system is operative only for straight track and curved track is of no concern to the present invention.

Vehicles 4 and 6 are illustrated as moving in linear direction 32 with vehicle 6 moving faster and closing the spacing therebetween. Also, the vehicle 4, in the alternative, may be stopped while the vehicle 6 is moving toward vehicle 4.

Located on the rear of vehicle 4 is a target retroreflector 34. The retroreflector 34 is commercially available and preferably comprises sheet material containing microreflective cubes (not shown) available from 3 M Corp. referred to as 2000X RetroReflective targets. It is a relatively thin sheet material also available in tape form with an adhesive backing. This material has two important characteristics.

The material returns approximately 2000 times more reflected light than an ordinary white reflecting surface such as white paper or white painted surfaces. Consequently, the reflected light beam incident on the target retroreflecting material produces a large contrast in intensity as compared to reflected ambient light from adjacent surfaces. This large intensity differential is present even should the retroreflector be placed on a white painted surface.

Because the material is a retroreflector, the incident light beam is always returned along substantially the same path as the incident light beam. As long as the beam is incident on the target material in the angular segment to which the target is responsive, the reflected beam is substantially coaxial with the incident beam. The desired entrance angle for the incident beam is preferably within the range of about ±30° for this material and for the present implementation. For entrance angles 30° and beyond, the target may be oriented for best angularity response.

Because the target retroreflector 34 material is relatively thin sheet material, the retroreflector may be applied to an existing surface on the rear of the vehicle 4 with no particular attention paid to orientation of the retroreflector relative to the beam while maintaining the relative angularity noted above. The beam 28 incident on the retroreflector 34 is returned substantially coaxial therewith although the plane of the reflector may be at various angles to the beam within the range given. In the alternative, other retroreflectors may be used such as those comprising a single retroreflector geometric configuration in accordance with a given implementation.

The beam 28 is focussed and has a relatively small diameter although this is not critical. The beam 28 is transmitted from the scanner 26 at location T where the beam emanates from the scanner 26. This location T is offset from the target retroreflector effective surface at region 36 distance d'. The distance d' to the target reflector 34 is measured from the effective retroreflector reflecting region 36 adjacent one edge of the reflector. This edge region determines the offset distance d' because it is this region which first approaches intersection with the transmitted beam 28 as the vehicles approach each other. That is, the incidence of the beam 28 on surface 5 of the forward vehicle 4 shifts in direction 33 as the vehicle 6 approaches vehicle 4. Region 36 is the initial retroreflector region which effectively reflects the incident beam as the beam traverses vehicle 4 in direction 33.

In FIG. 1, the scanner beam 28 is transmitted at angle α preferably of about 15° relative to axis 30. Assuming the vehicle 4 is in the position of vehicle 4' shown in phantom, the retroreflector 34' is to the left, in the Figure, of the beam 28 incident on the vehicle rear surface 5' and spaced from the incident beam 28. As the vehicle 6 approaches the vehicle 4, shown in solid line, the beam 28 incident on the vehicle 4 shifts to the left in direction 33 until the beam 28 is incident on the right edge region 36 of the retroreflector 34. The leftmost region of the retroreflector may not receive the beam 28 and is not important.

Therefore, the practical length of the region of the transverse width of the retroreflector from left to right in direction 33 is dimensioned sufficiently large to at least provide a return reflection of the incident beam 28. Additional retroreflector surface may be provided to allow for contamination in use to avoid loss of stopping control of the vehicles when the distance d is reached.

The retroreflector region 36 portion positioned to first receive the beam is the important area of the retroreflector for determining the spacing of the vehicles distance d under control of the scanner apparatus 7. The distance d can be changed by merely shifting the position of the retroreflector on a vehicle accordingly without alteration to the scanner 26. It is the geometry of the offset distance d' of the retroreflector to the scanner beam transmission location T and the angle α that determines the value of distance d.

The angle α may lie in any range of angles in accordance with the characteristics of the retrorerflector employed and with the desired spacing d between the vehicles. This angle may lie in the range of from greater than 0° to less than 90°.

In FIG. 2, a preferred scanner 26 comprises a light emitting diode (LED) 40 which emits light 42. The diode 40 is powered from power source 12 in the vehicle 6. The source is preferably 5 VDC for the scanner 26 circuitry and is derived from 24 VDC normally available on the vehicle 6. A beam splitter 44 is in the path of light 42 and preferably comprises a half silvered or dichroic mirror. Approximately 50% of the light 42 incident on the splitter 44 is reflected by the splitter forming beam 46, the rest of the light being lost.

Other sources of electromagnetic radiation may be used such as given by way of example in U.S. Pat. No. 5,302,835. Such sources may lie anywhere in the radiation spectrum and are not limited to visible light radiation.

Other types of beam splitters may be used, for example, a polarizing beam splitter as disclosed in the aforementioned U.S. Pat. No. 5,302,835, may be used in the alternative, should greater light transmission in the system be desired.

The beam 46 is focussed by lens 48 to form the transmitted beam 28. The return beam 28' reflected by the retroreflector 34 is gathered by lens 48 and applied to the beam splitter 44. 50% of the light from the return beam 28 is passed by the splitter 44 as beam 50. Beam 50 is applied to a photodiode detector 52 which preferably is a silicon photodiode. The loss of light due to the beam splitter is compensated for by selection of an appropriate light emitting diode 40 characteristics.

The incident beam on detector 52 causes an output signal to be generated amplified by amplifier 54. The output of the amplifier 54 is applied to threshold detector 56. The threshold detector 56 output signal $S_o$ is applied as an input to the control means 14.

The threshold detector 56 is preferably a bistable device which detects when the output of amplifier 54 reaches a given threshold amplitude and switches states to produce output signal $S_o$. Because various ambient light conditions may cause the scanner 26 to receive undesirable light signals at various levels, these light signals will be sensed and passed on to the detector 52. Also, the nature of the vehicle 6 is such that inductive devices such as motor 20 and relays or other equipment on the vehicle 6 may be switched on and off and generate electrical noise.

This electrical noise can interfere with the operation of the scanner circuitry. The scanner 26 could possibly interpret this noise as a light signal and respond erroneously, turning the motor 20 off. Once the motor is off, the interfering signal disappears and the scanner 26 low output signal would turn the motor back on and the cycle repeats.

Thus the threshold detector 56 senses when the output of amplifier 54 manifests a return beam 50 from the retroreflector 34. At this time the detector 56 switches output states to provide signal $S_o$ for turning motor 20 on. In FIG. 3, the threshold detector 56 may comprise a Schmitt trigger comprising an amplifier 58 and open collector transistor 60. When the output of the amplifier 54, FIG. 2, reaches a certain level, the transistor 60 switches states to drive the motor 20. When the light level to the amplifier 54 decreases about 50%, the transistor 60 switches states and turns off the motor 20. The difference between the turn on and off states of the transistor 60 provides a hysteresis to the threshold detector 56. The detector 56 stabilizes the circuit. Because the retroreflector provides an enhanced 2000 to one difference between ambient light and the reflected beam 28', the scanner 26 circuit is relatively insensitive to ambient light conditions.

Once the motor 20 is turned off, the gear reducer 22, FIG. 4 provides sufficient resistance to the rolling of the wheels 24 such that the vehicle is self locking. The vehicle may drift somewhat about one or two inches when the motor 20 is turned off. This is acceptable. Further factors in stopping the vehicle include the inclination of the vehicle tracks, whether the motor is hot or cold and others.

In operation, assuming the rear vehicle 6 is moving and the forward vehicle 4' is stopped, FIG. 1, the beam 28 of the scanner 26 is continuously on. As the rear vehicle 6 approaches the forward vehicle 4', the beam 29 impinges upon the rear surface of the forward vehicle 4'. Light reflected by the rear surface 5' is of insufficient intensity to operate the scanner 26 detector 52, FIG. 2, by way of the threshold detector 56. As the rear vehicle approaches the forward vehicle, the beam 28 incident on the froward vehicle shifts left in FIG. 1 until the beam is incident upon the retroreflector 34.

At this time the increased difference in intensity of the reflected beam over the ambient conditions causes the return beam 28' to be sensed and detected by diode detector 52. This switches the states of threshold detector 56 whose output signal $S_o$ turns off the motor 20 via the switched states of the threshold detector 56. At this time the vehicle 6 is approximately at distance d from the forward vehicle. The small amount of drift of the vehicle 6 is taken into consideration when turning off the motor 20 and in determining the distance d.

When the forward vehicle is later moved forward to cause the spacing between the vehicles to increase greater than distance d, the scanner 26 no longer receives the reflected beam 28'. The signal $S_o$ changes level and creates a start signal for the motor 20 in control means 14, FIG. 4. The control circuitry in control means 14, however, does not start the motor 20 immediately. The delay circuit 18, FIG. 4, delays the starting of the motor 20 until the forward vehicle is safely away from the rear vehicle a desired distance before the rear vehicle is permitted to move.

It will occur to one of ordinary skill that various modifications may be made to the disclosed apparatus which is given by way of illustration and not limitation. For example, the vehicles may include a transmitter (not shown) and the return reflected beam may be transmitted to a receiver located elsewhere not on the vehicle. The receiver could then generate a signal to stop the vehicle via an external braking system or to the vehicle braking system via a receiver on the vehicle for such a braking signal.

Also, the retroreflector need not be only on the rear of a vehicle, but may be on stationary objects as well such as fire doors. Such fire doors are interposed in walls of a building, the track running through the walls. A fire door on each wall closes off the opening normally used for a vehicle to pass through the wall providing fire protection. A motor opens add closes the fire door. A control in the system automatically opens the fire door when a vehicle approaches. The fire doors may have a retroreflector thereon such that an approaching vehicle is stopped if the fire door for some reason remains closed. The retroreflector may reflect the signal incident thereon from the vehicle scanner to a receiver located nearby and not necessarily on the vehicle.

The receiver in this case would transmit a control signal to stop the vehicle. For example, a braking system, not necessarily located on the vehicle, could be employed in the vehicle control system responsive to the control signal for stopping the vehicle by using external brake devices.

In the present embodiment, it is preferred that the receiver and braking system be located on the vehicle as described herein. The scope of the invention is as defined in the appended claims.

What is claimed is:

1. Apparatus for sensing a predetermined distance between two objects exhibiting relative movement along a path of a given direction, the apparatus comprising:

beam generating means for generating and transmitting an electromagnetic radiation beam from one of the objects and arranged to be inclined relative to the direction of the path a given angle of inclination value and directed generally toward the other of said objects;

an electromagnetic radiation beam reflector arranged to be secured to said other of the objects in a position for receiving the transmitted beam incident thereon when the objects are spaced apart a distance approximately no greater than said predetermined distance and for reflecting the incident beam; and beam detecting means for receiving the reflected beam, said detecting means including means responsive to the reflected beam incident thereon for generating an output signal manifesting the objects at said predetermined distance;

said path defining an axis, said apparatus including means for spacing the reflector effective reflector surface from said axis a distance different than the spacing of said transmitted beam at said beam generating means from said axis and which difference in spacing manifests the predetermined distance.

2. The apparatus of claim 1 wherein said beam generating means and reflector include means arranged so that the transmitted beam and reflected beam are substantially coaxial.

3. The apparatus of claim 2 wherein the reflector is a retroreflector.

4. The apparatus of claim 1 wherein the angle of inclination of the beam to the path given direction is in the range of greater than 0° and less than 90°.

5. The apparatus of claim 1 wherein one of said objects is moving relative to and toward the other of said objects, said apparatus including means arranged to be coupled to the moving object and responsive to said output signal applied as an input thereto for stopping the movement of said moving object.

6. The apparatus of claim 1 wherein said beam generating means comprises a light source for generating a light beam, beam splitter means for receiving said generated light beam, and focussing means for focussing said generated light beam from said beam splitter means to create said radiation beam and for focussing and transmitting said created beam on said reflector.

7. The apparatus of claim 6 wherein the beam splitter means comprises means for transmitting at least a component of said light beam to said focussing means, said detecting means comprising a light detector, said focussing means for receiving said reflected beam and for applying said reflected beam to said beam splitter, said beam splitter for applying at least a component of the beam received thereby to said light detector.

8. The apparatus of claim 1 wherein the detecting means includes beam detecting means for detecting the reflected beam and for generating a first signal in response to the detection of said beam and threshold detecting means responsive to the first signal applied thereto for generating said output signal in response to said first signal having a given threshold value.

9. The apparatus of claim 8 wherein the threshold detecting means comprises a Schmitt trigger circuit for generating the output signal when the first signal reaches or exceeds said given threshold value.

10. The apparatus of claim 1 wherein the difference in spacing and the value of the angle of inclination together manifest the predetermined distance.

11. Apparatus for sensing a predetermined distance between first and second vehicles in which at least one of the vehicles is moving along a predetermined path of a given direction relative to the second vehicle on said path, said apparatus comprising:

electromagnetic radiation beam generating means including means for securing the generating means to the first vehicle for transmitting a radiation beam inclined relative to the given direction of the path and directed generally toward the second vehicle;

an electromagnetic radiation beam reflector arranged to be secured to the second vehicle in a position for selectively receiving and reflecting the transmitted beam when the vehicles are spaced apart a distance approximately no greater than the predetermined distance; and radiation detecting means arranged to be secured to the first vehicle for receiving the reflected radiation beam and responsive to the received reflected radiation incident thereon for generating an output signal manifesting the spacing of said vehicles when at said predetermined distance;

the beam generated by said generator means including means arranged so that the beam is transmitted from a first location on the first vehicle and the reflector means has an effective reflector region at a second location on the second vehicle, the first and second locations being offset from one another a given value in a direction transverse the path given direction such that the offset given value is proportional to the predetermined distance.

12. The apparatus of claim 11 wherein the detecting means includes an electromagnetic radiation detector for generating a first signal in response to said received portion of the reflected beam, amplifier means for amplifying said first signal, said amplified first signal having a variable amplitude, said detecting means including output means for sensing said variable amplitude and for generating said output signal when a given threshold value of said variable amplitude is sensed.

13. The apparatus of claim 11 wherein said path comprises a rail network, said vehicles each including means guided by said rail network, said vehicles including means for operating said vehicles on said rail network and responsive to said output signal for stopping said first vehicle.

14. The apparatus of claim 11 wherein said reflector is a planar sheet retroreflector material for reflecting an incident beam along the substantially same path as received.

15. The apparatus of claim 11 wherein said beam generating means and detector means are arranged to transmit and receive said beams substantially coaxially.

16. The apparatus of claim 11 wherein the value of the offset and the value of the angle of inclination of the beam to the given direction together manifest the value of said predetermined distance.

17. An apparatus for sensing a predetermined distance between adjacent first and second vehicles in which the vehicles normally move along a predetermined path of a given direction, each vehicle including means for selectively moving and stopping the vehicle along the path in said given direction; said apparatus comprising:

electromagnetic radiation beam generating means for transmitting the beam from a position on the first vehicle relative to a given axis defining said given direction, said generating means for transmitting the beam inclined relative to said axis and directed generally toward the second vehicle;

an electromagnetic radiation beam reflector arranged to be in a position on the second vehicle offset from the beam generating means transversely relative to said given axis for selectively receiving and reflecting the emitted beam when the vehicles are spaced apart the predetermined distance; and radiation detecting means for receiving the reflected radiation beam and responsive to at least a portion of the received reflected radiation incident thereon for generating an output signal manifesting the spacing of said vehicles at said predetermined distance and for applying said output signal to said means for stopping said first vehicle for stopping said first vehicle effectively at said predetermined spacing.

18. The apparatus of claim 17 wherein said generating means includes a first diode for emitting light for generating said beam and a second diode for detecting said received reflected beam.

19. The apparatus of claim 17 wherein the reflector effective reflective region is offset from the beam transmitting location at the beam generator means an offset distance, the offset distance and the angle of inclination of the generated beam are such that the predetermined distance is proportional to said offset distance.

20. Apparatus for detecting a predetermined distance between two vehicles moving on a track, each vehicle including control means for starting and stopping the vehicle, the apparatus comprising:

electromagnetic radiation beam generating means including means for securing the generating means to a first vehicle for transmitting a radiation beam inclined relative to the given direction of the path and directed generally toward a second vehicle, said generating means including a photodiode for emitting light, a beam splitter for diverting at least a portion of the emitted light, and light focussing and gathering means responsive to said diverted light portion for transmitting said beam;

an electromagnetic radiation beam retroreflector arranged to be secured to the second vehicle in a position for selectively receiving and reflecting the emitted beam when the vehicles are spaced apart a distance approximately no greater than the predetermined distance;

radiation detecting means including a photodiode light detector for receiving the reflected radiation beam gathered by said light gathering means and passed through said beam splitter, said photodiode light detector being responsive to received radiation incident thereon for generating an output signal, said detecting means including threshold detecting means for detecting when the output signal has a threshold level manifesting said predetermined distance and for generating a distance signal manifesting the spacing of said vehicles when at said predetermined distance; and means for applying said distance signal to said first vehicle control means to stop said first vehicle approximately at said predetermined distance.

21. Apparatus for sensing a predetermined distance between two objects exhibiting relative movement along a path of a given direction, the apparatus comprising:

beam generating means for generating and transmitting an electromagnetic radiation beam from one of the objects and arranged to be inclined relative to the direction of the path and directed generally toward the other of said objects;

an electromagnetic radiation beam reflector arranged to be secured to said other of the objects in a position for receiving the transmitted beam incident thereon when the objects are spaced apart a distance approximately no greater than said predetermined distance and for reflecting the incident beam; and beam detecting means for receiving the reflected beam, said detecting means including means responsive to the reflected beam incident thereon for generating an output signal manifesting the objects at said predetermined distance;

said beam generating means comprising: a light source for generating a light beam, beam splitter means for receiving said generated light beam and focussing means for focussing said generated light beam from said beam splitter means to create said radiation beam and for focussing and transmitting said created beam onto said reflector;

said beam splitter means comprising means for transmitting at least a component of said light beam to said focussing means, said detecting means comprising a light detector, said focussing means for receiving said reflected beam and for applying said reflected beam to said beam splitter, said beam splitter for applying at least a component of the beam received thereby to said light detector.

22. Apparatus for sensing a predetermined distance between two objects exhibiting relative movement along a path of a given direction, the apparatus comprising:

beam generating means for generating and transmitting an electromagnetic radiation beam from one of the objects and arranged to be inclined relative to the direction of the path and directed generally toward the other of said objects;

an electromagnetic radiation beam reflector arranged to be secured to said other of the objects in a position for receiving the transmitted beam incident thereon when the objects are spaced apart a distance approximately no greater than said predetermined distance and for reflecting the incident beam; and beam detecting means for receiving the reflected beam, said detecting means including means responsive to the reflected beam incident thereon for generating an output signal manifesting the objects at said predetermined distance;

the beam detecting means including means for detecting the reflected beam and for generating a first signal in response to the detection of said beam and threshold detecting means responsive to the first signal applied thereto for generating said output signal in response to said first signal having a given threshold value.

23. Apparatus for sensing a predetermined distance between first and second vehicles in which at least one of the vehicles is moving along a predetermined path of a given direction relative to the second vehicle on said path, said apparatus comprising:

electromagnetic radiation beam generating means including means for securing the generating means to the first vehicle for transmitting a radiation beam inclined relative to the given direction of the path and directed generally toward the second vehicle;

an electromagnetic radiation beam reflector arranged to be secured to the second vehicle in a position for selectively receiving and reflecting the transmitted beam when the vehicles are spaced apart a distance approximately no greater than the predetermined distance; and radiation detecting means arranged to be secured to the first vehicle for receiving the reflected radiation beam and responsive to the received reflected radiation incident thereon for generating an output signal manifesting the spacing of said vehicles when at said predetermined distance;

the detecting means including an electromagnetic radiation detector for generating a first signal in response to said received portion of the reflected beam, amplifier means for amplifying said first signal, said amplified first signal having a variable amplitude, said detecting means including output means for sensing said variable amplitude and for generating said output signal when a given threshold value of said variable amplitude is sensed.

* * * * *